April 1, 1952     F. W. OPP ET AL     2,591,597
ELECTRIC WEED-KILLING APPARATUS
Filed Aug. 29, 1949
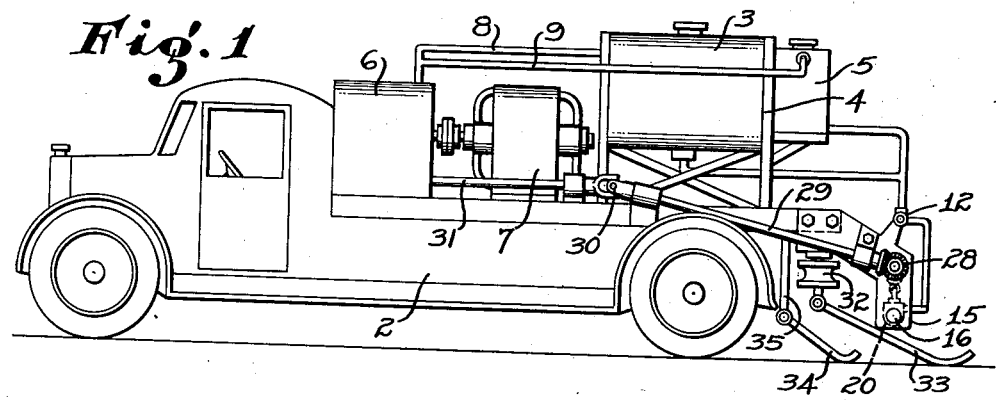
*Fig. 1*
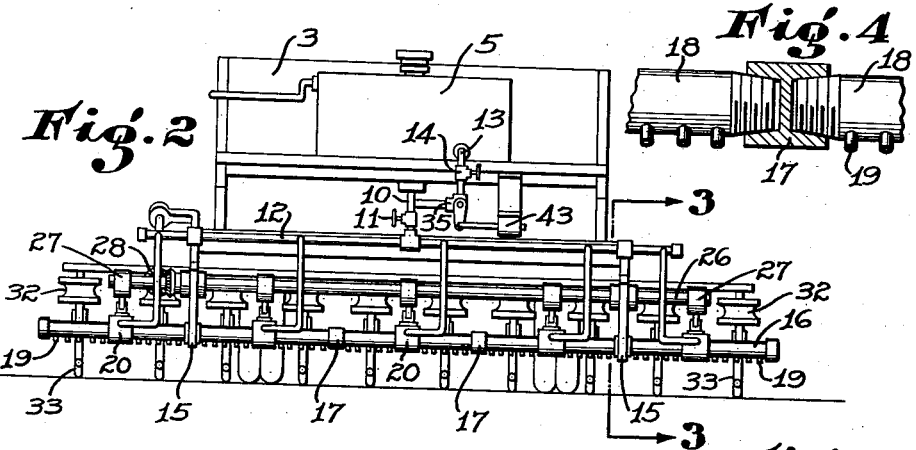
*Fig. 2*    *Fig. 4*
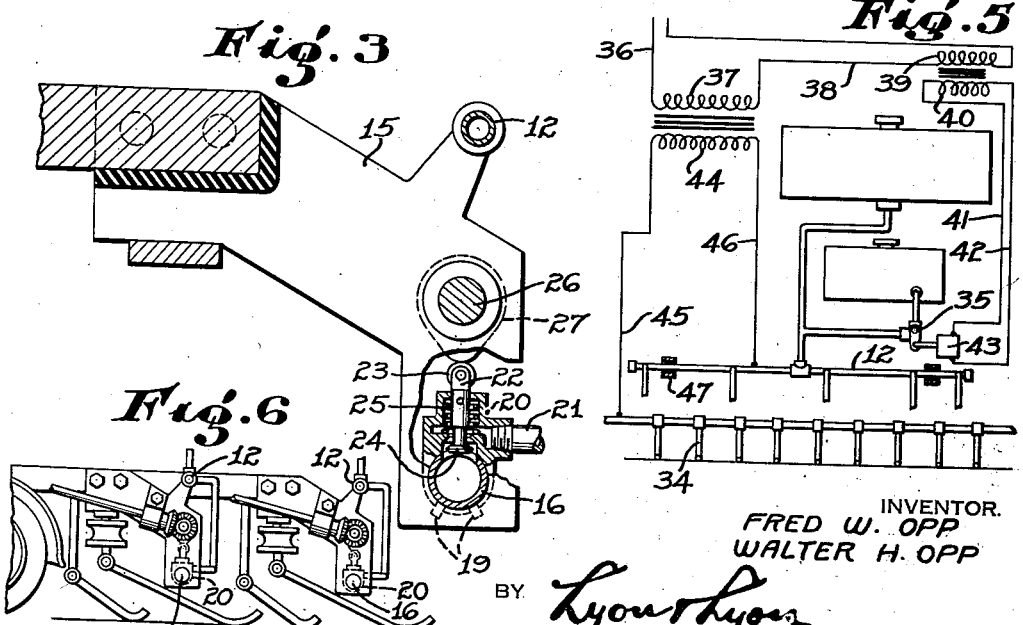
*Fig. 3*    *Fig. 5*    *Fig. 6*
INVENTOR.
FRED W. OPP
WALTER H. OPP
BY *Lyon & Lyon*
ATTORNEYS.

Patented Apr. 1, 1952

2,591,597

UNITED STATES PATENT OFFICE 2,591,597

ELECTRIC WEED-KILLING APPARATUS

Fred W. Opp, Costa Mesa, and Walter H. Opp, Altadena, Calif.

Application August 29, 1949, Serial No. 113,001

7 Claims. (Cl. 47—1.3)

This invention relates to an apparatus which is designed primarily for the purpose of killing weeds. The apparatus also has, however, utility in the treatment of soil for stimulating the same and supplying the soil with minerals. The application relates to that type of apparatus where the weed killing and soil stimulation is effected by the utilization of electric currents.

In most prior apparatus the electric currents have been applied to weeds through mechanical contacts. While such apparatus is effective for weed destruction for the larger weeds it may be ineffective to destroy some of the tiny weed plants not brought into contact with the mechanically operated electrodes.

The major object of the present invention is to provide an apparatus for the electrical destruction of weeds which is more effective upon tiny or small plants than the apparatus heretofore used.

In accordance with the present invention we effect contact with the plant or soil to be treated by spraying onto the plants or soil to be treated a conductive liquid connected to a suitable source of electrical potential so that the spray of conductive liquid constitutes a sort of distributing electric contact member which insures that the electrical treatment shall be carried out over the entire surface of the soil to be treated. We thereby effectively reach all of the tiny and small weed plants to be treated and kill these as effectively as the larger plants.

Other objects and advantages of the apparatus of the present invention will be more fully understood from the following description of a preferred example of an apparatus embodying the invention, the description being given in connection with the accompanying drawings:

Figure 1 is a side elevation;

Figure 2 is a rear view;

Figure 3 is a fragmentary section on the line 3—3 of Figure 2;

Figure 4 is a fragmentary view partially in section of a connection between sections of one of the pipes;

Figure 5 is an electrical diagram; and

Figure 6 is a fragmentary elevation of a modified form of the invention.

Referring to the drawings the apparatus of the present invention comprises a vehicle or truck body 2 upon which is mounted the remaining apparatus of the invention in order that the same may be transported over an area of soil which is to be treated. Upon the truck body is mounted a tank 3 which is intended to contain a highly conductive liquid, such, for example, as a salt solution which, in certain cases, may be a solution of plant food such as a potash, nitrate or phosphate compound. The tank 3 is preferably supported by frame members 4 in elevated position on the truck 2. Also supported by the frame members 4 is a second tank 5 which tank may be used for holding various weed killing compositions.

Mounted upon the truck is a motor and compressor 6 which is connected to drive an electric generator 7. From the compressor of the motor 6 lines 8 and 9 lead respectively to the tanks 3 and 5 for maintaining the tanks under pressure in order that, when desired, the contents thereof may be discharged as hereafter described. From tank 3 a line 10 controlled by a valve 11 leads to a distributor pipe 12. From tank 5 there is also provided a line 13 controlled by a valve 14 leading to the same distributor pipe 12. By means of the valves 11 and 14 the operator may proportion the weed killing composition withdrawn from tank 5 with reference to the conductive water withdrawn from tank 3. There is also provided in line 13 a control valve 35 intended to be operated automatically by a solenoid as hereafter described.

At the rear of the truck 2 there is provided a pair of brackets 15 which, as indicated more particularly in Figure 3, serve as a mounting for the distributor pipe 12. These brackets 15 also support a sectional pipe 16, each section of which is connected together as indicated in Figure 4 by a dead-end coupling 17 so that the ends of the pipe sections 18 are shut off from each other. Each pipe section 18 is provided with a plurality of downwardly directed orifice members 19.

On the center of each pipe section 18 there is provided a cam actuated valve 20 which connects with a line 21 leading to the distributor pipe 12. Each cam actuated valve 20 comprises a plunger 22 having a roller 23 thereof which operates a valve member 24 normally yieldingly urged to a closed position by a spring 25. On downward movement of the plunger 22 the valve head is adapted to open to connect the line 21 to the pipe section 18.

Mounted above the section pipe 18 is a cam shaft 26 which carries cams 27 which are offset relative to each other so that the different valves 20 of the apparatus are opened alternately as the shaft 26 is rotated. Shaft 26 is supported by brackets 15 at its ends and is provided with gears 28 by which connection is made to the drive-shaft 29 leading through the universal coupling 30 to drive shaft 31 extending from the motor 6.

There is also suspended from the rear of the truck a plurality of insulators 32, one corresponding to each of the valves 20 of pipe section 18. Each insulator supports a pivoted spring contract arm 33 which is designed to be dragged against the surface of the soil over which the vehicle 2 is transported and is in position to be struck by the fluid sprays emitted from the orifices 19 of the pipe sections 18. There is also provided a second series of contact arms 34 supported on rods 35 depended from the frame of the vehicle 2. These contact arms 34 are indicated as disposed somewhat in advance of the contact members 33.

Now referring to Figure 5 of the drawings, the generator 7 (Fig. 1) has an output connected by line 36 to the primary 37 of a transformer to which a line 38 leads through primary 39 of a second transformer to the generator.

The transformer is a small low voltage transformer, the secondary 40 of which is connected by lines 41 and 42 to a solenoid 43 which operates the valve 35. The transformer of which 37 is the primary is a large heavy duty transformer designed for and capable of converting 110 to 220 volts A. C. to 8000 to 20,000 volts A. C. and capable of supplying several kilowatts of power. The secondary 44 of this transformer has one side connected by the line 45 with the spring arms 34 which serve thus as a means for grounding one side of the secondary to the earth. The other side of the secondary is connected through a line 46 to the distributor pipe 12. It is essential that the distributor pipe 12 be electrically insulated from the frame of the truck body 2 and for such purpose therefore there must be insulated mountings 47 for the pipe 12 where the same is supported by the brackets 15. Likewise the frame members 4 upon which tanks 3 and 5 are supported must be of insulating material and shaft 29 must also be of insulating material.

In operation of the apparatus of the present invention the apparatus is driven slowly over an area of ground to be treated. Motor 6 maintains tanks 3 and 5 under compression in order that the fluid contents thereof may be discharged under pressure. At the same time motor 6 by energizing generator 7 through transformers 39 and 40, opens the valve 35 so that fluid from tanks 3 and 5 is supplied to the distributor pipe 12 in accordance with the proportions determined by valves 11 and 14. Simultaneously, the cam shaft 26 is rotated so as to cause the different valves 20 to be successively opened and closed. In this way fluid from the distributor pipe 12 is supplied to only one section of the pipe 16 at a time. The fluid supplied to any particular section of the pipe 16 is sprayed from that pipe under considerable velocity through its orifices 19 downwardly against the ground and the contact arms 33. This fluid completes the electrical circuit so that the current flows from the arms 33 to the ground and hence to arms 34.

Thus, in a sense, one electrode of the apparatus is provided by the liquid ejected from the nozzles of one of the sections of pipe 16. We find that this type of contact with the ground in operation produces a markedly superior weed killing action than has been obtained by previous forms of apparatus.

While in the apparatus as illustrated we have shown one side of the source of electrical potential connected to the soil by means of the spring arms 34 while the other side of the potential is actually connected to the earth by means of the liquid ejector from the nozzles of pipe 16, in certain cases both connections at the ground can be made by water sprays, in which case we substitute for the arms 34 water spray grounding apparatus. Such an apparatus is illustrated in Figure 6 of the drawings. As illustrated in Figure 6 the rear end of the truck is modified so that in addition to the truck being provided with one set of the water spray electrodes, which include the distributor pipe 12, sectional pipe 16 with its orifices 19, and cam actuated valve 20, there is provided a second apparatus duplicating the first as illustrated, in which case each of said apparatuses must be insulated from the other and driven by separate motors and provided with separate sources of fluid supply (not shown).

In previous forms of apparatus reliance is placed on mechanical contact which although effective on the larger plants were often ineffective on tiny plants in depressions or behind clods. By the apparatus of the present invention we are able to subject even tiny plants in depressions to the action of the electric current so as to thereby secure a more efficient and complete weed killing action. The cam system by which one section only of the pipe 16 is allowed to become operative at one time assures a greater concentration of current thereby increasing the effectiveness of the weed killing action.

It is believed also from the results of operations that in addition to the weed killing action there is a substantial effect upon the soil by the apparatus of the present invention which is stimulating to the growth of plants, this effectiveness being created by electric action on the soil rendering the minerals of the soil more susceptible to utilization by future planted crops or there are minerals provided for the soil by the electrical arc treatment. In any event great improvements in the size of crops grown on areas treated by the apparatus of the present invention are noted.

While the particular form of the apparatus herein described is well adapted to carry out the objects of the present invention various modifications and changes may be made and this invention is of the scope set forth in the appended claims.

We claim:

1. An apparatus for treating soil and weeds in situ which comprises, means for generating a source of electrical potential, means for connecting one side of the source of electrical potential to the earth, a plurality of spray pipe sections designed for spraying liquid onto the earth, means for supporting said sections spaced above the earth, means for connecting one side of said electrical potential to said spray pipe sections, and means for causing said spray pipe sections to be successively effective for spraying liquid toward the earth, and means for transporting said apparatus relative to the earth.

2. An apparatus for treating soil and weeds in situ which comprises, means for generating a source of electrical potential, means for connecting one side of the source of electrical potential to the earth, a plurality of spray pipe sections designed for spraying liquid onto the earth, means for supporting said sections spaced above the earth, means for connecting one side of said electrical potential to said spray pipe sections, and means for causing said spray pipe sections to be successively effective for spraying liquid towards the earth, said latter means comprising a valve for each section of spray pipe, and means for actuating said valves in succession.

3. An apparatus for treating soil and weeds in situ which comprises, means for generating a source of electrical potential, means for connecting one side of the source of electrical potential to the earth, a plurality of spray pipe sections designed for spraying liquid onto the earth, means for supporting said sections spaced above the earth, means for connecting one side of said electrical potential to said spray pipe sections, and means for causing said spray pipe sections to be successively effective for spraying liquid towards the earth, said means including a valve for each pipe, a common rotating cam shaft, and cam means actuated by said shaft.

4. An apparatus for treating soil and weeds in situ which comprises, means for generating a source of electrical potential, a pair of liquid containers, a plurality of spray pipe sections supported above the soil to be treated, means for connecting said liquid containers to said spray pipe sections in succession, and means connecting said source of potential to said spray pipe sections and to the soil to be treated.

5. An apparatus for treating soil and weeds in situ which comprises, means for generating a source of electrical potential, a pair of liquid containers, a plurality of spray pipe sections supported above the soil to be treated, means for connecting said liquid containers to said spray pipe sections in succession, and means connecting said source of potential to said spray pipe sections and to the soil to be treated.

6. An apparatus for treating soil and weeds in situ which comprises, a vehicle, means for generating a source of electrical potential mounted on said vehicle, means connected to said vehicle for grounding one side of said potential to the soil over which it passes, a source of fluid on said vehicle insulated from the ground side of said potential, a plurality of spray pipe sections supported by said vehicle spaced shortly above the soil, means for automatically in succession connecting said spray pipe sections to said source of fluid, and means for connecting said electrical potential to said spray pipe sections.

7. An apparatus for treating soil and weeds in situ which comprises, a vehicle, means for generating a source of electrical potential mounted on said vehicle, means connected to said vehicle for grounding one side of said potential to the soil over which it passes, a liquid container on said vehicle insulated from the ground side of said potential, a plurality of spray pipe sections supported by said vehicle spaced shortly above the soil, means for automatically in succession connecting said spray pipe sections to said liquid container, and means for connecting said electrical potential to said spray pipe sections, the connection between said container for liquid and spray pipe sections including a valve for each spray pipe section having a separate connection with said liquid container, and mechanically cam actuated means for successively operating said valves.

FRED W. OPP.
WALTER H. OPP.

No references cited.